(12) United States Patent
Kim et al.

(10) Patent No.: US 8,867,441 B2
(45) Date of Patent: Oct. 21, 2014

(54) WIRELESS APPARATUS FOR A MULTI-CARRIER SYSTEM

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 568 days.

(21) Appl. No.: 13/144,478

(22) PCT Filed: Jan. 14, 2010

(86) PCT No.: PCT/KR2010/000222
§ 371 (c)(1),
(2), (4) Date: Jul. 13, 2011

(87) PCT Pub. No.: WO2010/082766
PCT Pub. Date: Jul. 22, 2010

(65) Prior Publication Data
US 2011/0273996 A1    Nov. 10, 2011

Related U.S. Application Data

(60) Provisional application No. 61/144,701, filed on Jan. 14, 2009.

(51) Int. Cl.
*H04W 4/00* (2009.01)
*H04W 72/12* (2009.01)
*H04J 11/00* (2006.01)
*H04L 5/00* (2006.01)

(52) U.S. Cl.
CPC ......... *H04L 5/0091* (2013.01); *H04W 72/1294* (2013.01); *H04L 5/0048* (2013.01); *H04J 11/0069* (2013.01); *H04W 72/1284* (2013.01); *H04L 5/0044* (2013.01); *H04W 72/1289* (2013.01); *H04W 72/1278* (2013.01)
USPC ........................................................ 370/328

(58) Field of Classification Search
None
See application file for complete search history.

(56) References Cited

U.S. PATENT DOCUMENTS

2007/0253442 A1    11/2007  Yu et al.
2009/0279500 A1*  11/2009  Luo et al. .................... 370/330
2011/0110296 A1*   5/2011  Malladi et al. .............. 370/328

FOREIGN PATENT DOCUMENTS

KR    10-0863791    10/2008

OTHER PUBLICATIONS

Author Unknown, 3GPP TS 36.213 Version 8.5.0, dated Dec. 2008, pp. 1-74.*
Author Unknown, 3GPP TS 36.211 Version 8.5.0, dated Dec. 2008, pp. 1-82.*

* cited by examiner

*Primary Examiner* — John Blanton
*Assistant Examiner* — Christopher Crutchfield
(74) *Attorney, Agent, or Firm* — Lee, Hong, Degerman, Kang & Waimey

(57) ABSTRACT

A wireless apparatus for a multi-carrier system is disclosed. The wireless apparatus comprises; a control channel unit which monitors a control channel transmitted via at least one carrier from among a plurality of carriers; and a data channel unit which transmits or receives data packets to or from a data channel using the resource allocation received from the control channel. The control channel unit monitors the control channel in a plurality of search space in a subframe.

7 Claims, 21 Drawing Sheets

WIRELESS APPARATUS FOR A MULTI-CARRIER SYSTEM

CROSS-REFERENCE TO RELATED APPLICATIONS

This application is a 371 U.S. national stage application of International Application No. PCT/KR2010/000222, filed on Jan. 14, 2010, which claims priority to U.S. Provisional Application Ser. No. 61/144,701, filed on Jan. 14, 2009, the contents of which are incorporated by reference herein in their entirety.

TECHNICAL FIELD

The present invention relates to a wireless communication, and more particularly, to an apparatus and method for transmitting or monitoring a control channel in a multiple carrier system.

BACKGROUND ART

Wireless communication systems are widely deployed in order to provide various kinds of communication services, such as voice and data. In general, the wireless communication system is a multiple access system which can support communication with multiple users by sharing available system resources (bandwidth, transmission power, etc.). Examples of the multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system and the like.

In a common wireless communication system, only one carrier is chiefly taken into consideration although the bandwidth between uplink and downlink is differently set. Hereafter, the carrier is defined by the center frequency and the bandwidth. The multiple carrier system uses a plurality of carriers having a bandwidth smaller than the entire bandwidth.

For example, a current 3GPP LTE (long term evolution) system based on the 3GPP ($3^{rd}$ Generation Partnership Project) TS (Technical Specification) Release 8 supports only one bandwidth (i.e., one carrier) of {1.4, 3.5, 10, 15, and 20} MHz bandwidths. In order to support the total bandwidth of 40 MHz, the multiple carrier system uses two carriers each having a 20 MHz bandwidth or uses three carriers having a 20 MHz bandwidth, a 15 MHz bandwidth, and 5 MHz bandwidth, respectively.

The multiple carrier system is advantageous in that it can guarantee backward compatibility with the existing system and can greatly increase the data rate through multiple carriers.

3GPP LTE is based on dynamic scheduling in order to transmit and receive downlink data and uplink data. A control channel informing the resource allocation of uplink data or uplink data or both is called a PDCCH (Physical Downlink Control Channel).

In order to detect a control channel, 3GPP LTE uses blind decoding. A user equipment de-masks its own identifier in the Cyclic Redundancy Check (CRC) of a received PDCCH and recognizes a control channel as its own control channel if CRC error is not generated.

The existing system may be inefficient if the structure of a control channel is utilized even in multiple carriers because a single carrier is a precondition.

DISCLOSURE

Technical Problem

The present invention provides a method and apparatus for monitoring a control channel in a multiple carrier system.

The present invention also provides a method and apparatus for transmitting a control channel in a multiple carrier system.

Technical Solution

In an aspect, a wireless apparatus for a multiple carrier system includes a control channel unit for monitoring a control channel transmitted over at least one of a plurality of carriers and a data channel unit for transmitting or receiving a data packet over a data channel using resource allocation received over the control channel. The control channel unit monitors the control channel in at least one of a common search space, a User Equipment (UE)-specific search space, and an additional search space within a subframe.

The additional search space may be defined based on an index of a used carrier.

The starting position of the additional search space may be defined based on the position of the common search space or the position of the UE-specific search space.

The resource allocation may include the index of a carrier through which the data channel is transmitted.

In another aspect, a method of monitoring a control channel in a multiple carrier system includes monitoring a first control channel within a first search space within a subframe of at least one of a plurality of carriers and monitoring a second control channel within a second search space of the subframe. First resource allocation of the first control channel and second resource allocation of the second control channel relate to different carriers.

In yet another aspect, a wireless apparatus for a multiple carrier system includes a control channel unit for configuring a first control channel, including the first resource allocation of a first carrier, and a second control channel including the second resource allocation of a second carrier, mapping the first control channel within a first search space within a subframe, and mapping the second control channel within a second search space within the subframe, and a transmission unit for transmitting the first and the second control channels through the subframe.

Advantageous Effects

The monitoring of a control channel in a multiple carrier system is proposed. The blind decoding of a control channel can be implemented in multiple carriers.

DESCRIPTION OF DRAWINGS

FIG. 13 shows an example of an interleaved search space.

MODE FOR INVENTION

Figure 1:
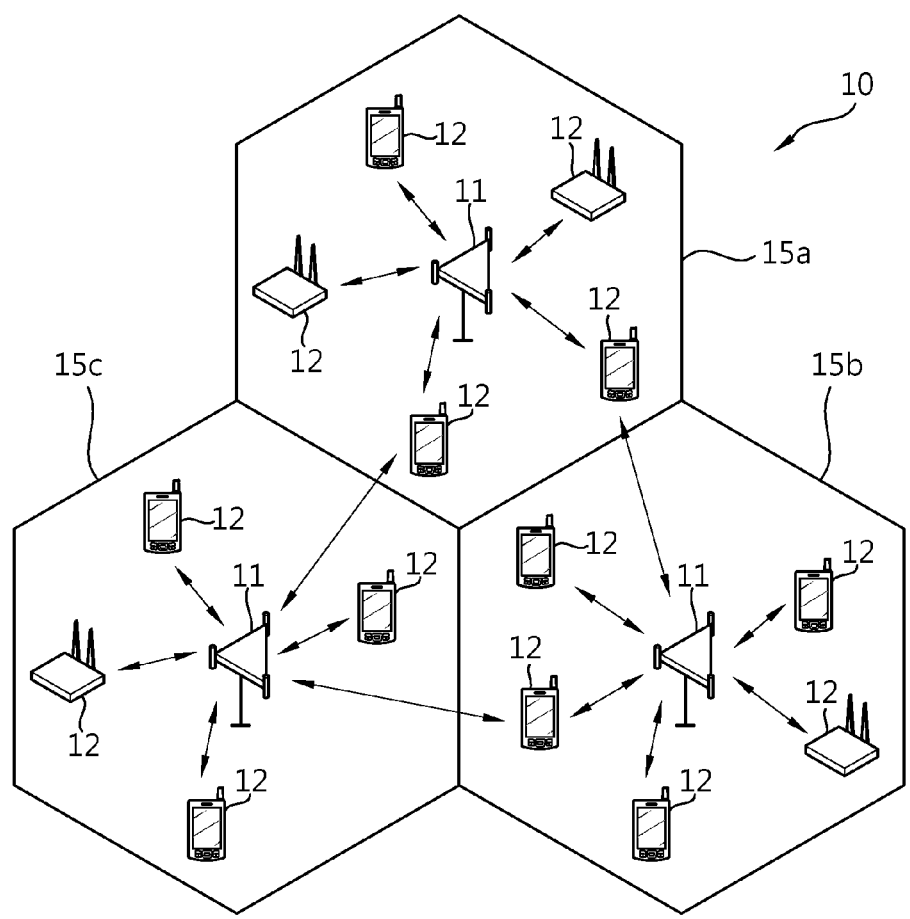
FIG. 1 shows a wireless communication system.

FIG. 1 shows a wireless communication system. The wireless communication system 10 includes one or more Base Stations (BS) 11. The BSs 11 provide communication services to specific geographical areas (commonly called a cell) 15$a$, 15$b$, and 15$c$, respectively. The cell may be divided into a number of areas (called sectors).

A User Equipment (UE) 12 may be fixed or mobile. The UE may be called another terminology, such as an MS (mobile station), an MT (mobile terminal), a UT (user terminal), an SS (subscriber station), a wireless device, a PDA (personal digital assistant), a wireless modem, or a handheld device.

The BS 11 chiefly refers to a fixed station which communicates with the UE 12. The BS may also be called another terminology, such as an eNB (evolved-NodeB), a BTS (Base Transceiver System), or an access point.

Hereinafter, downlink refers to communication from a BS to a UE, and uplink refers to communication from a UE to a BS. In downlink, a transmitter may be part of a BS, and a receiver may be part of a UE. In uplink, a transmitter may be part of a UE, and a receiver may be part of a BS.

Figure 2:
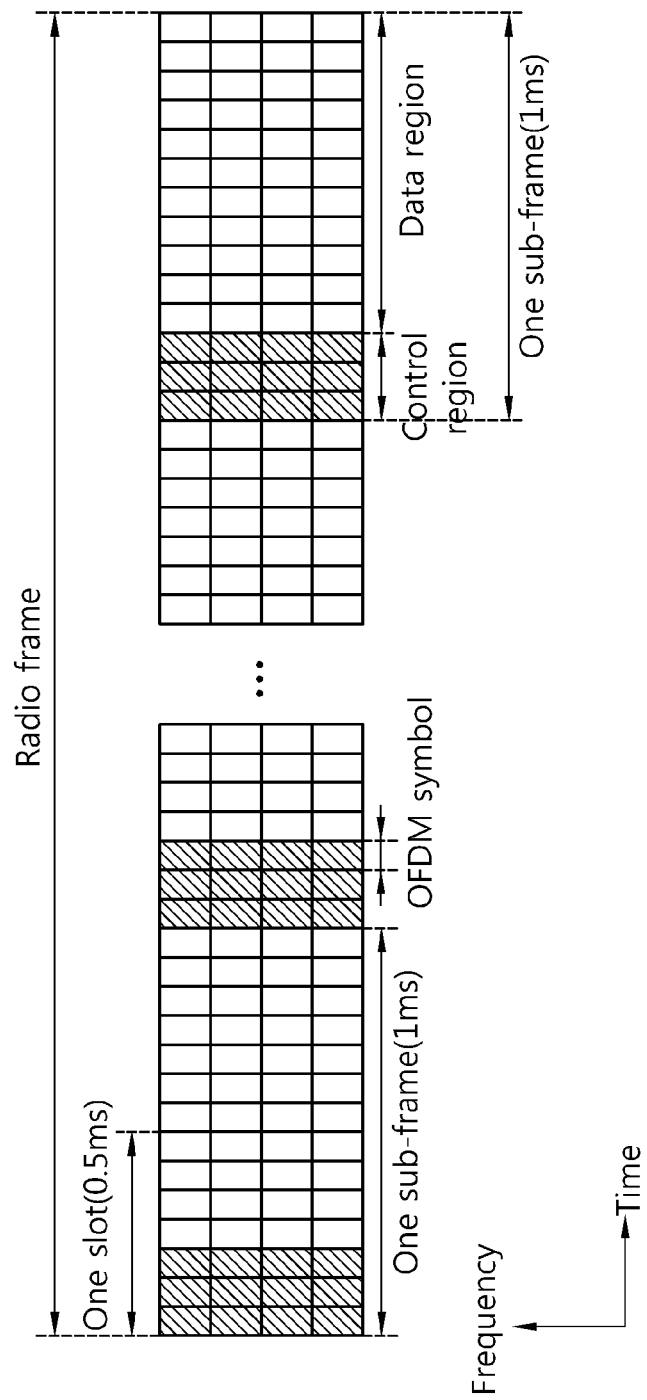
FIG. 2 shows the structures of a radio frame and a subframe in 3GPP LTE.

FIG. 2 shows the structures of a radio frame and a subframe in 3GPP LTE. The radio frame is composed of 10 subframes. One subframe consists of 2 slots. The time taken to transmit one subframe is called a TTI (transmission time interval). For example, the length of one subframe may be 1 ms, and the length of one slot may be 0.5 ms.

One slot includes a plurality of OFDM (orthogonal frequency division multiplexing) symbols in the time domain. One slot includes 7 OFDM symbols in a normal CP (Cyclic Prefix), and one slot includes 6 OFDM symbols in an extended CP.

An OFDM symbol is used to represent one symbol duration in the time domain because a 3GPP LTE system adopts OFDMA in downlink. The OFDM symbol may be said to be an SC-FDMA symbol or a symbol duration according to a multiple access method.

A resource block is a resource allocation unit in 3GPP LTE, and the resource block includes a plurality of consecutive subcarriers (e.g., 12 subcarriers) in one slot.

As disclosed in 3GPP TS 36.211 V8.5.0 (2008-12) "Evolved Universal Terrestrial Radio Access (E-UTRA); Physical Channels and Modulation (Release 8)", in LTE, the physical channels may be divided into a PDSCH (Physical Downlink Shared Channel) and a PUSCH (Physical Uplink Shared Channel) which are data channels and a PDSCH (Physical Downlink Control Channel) and a PUCCH (Physical Uplink Control Channel) which are control channels.

The subframe is divided into a control region and a data region in the time domain. The control region includes a maximum of 3 OFDM symbols in the first slot of the subframe, but the number of OFDM symbols included in the control region may be changed. PDCCHs are allocated to the control region, and PDSCHs are allocated to the data region.

Control information transmitted over a PDCCH is called DCI (Downlink Control Information). The DCI may include the resource allocation of PDSCHs (this is called a DL grant), the resource allocation of PUSCHs (this is called an uplink grant), a set of transmit power control commands for individual UEs within a certain UE group and the like.

Figure 3:
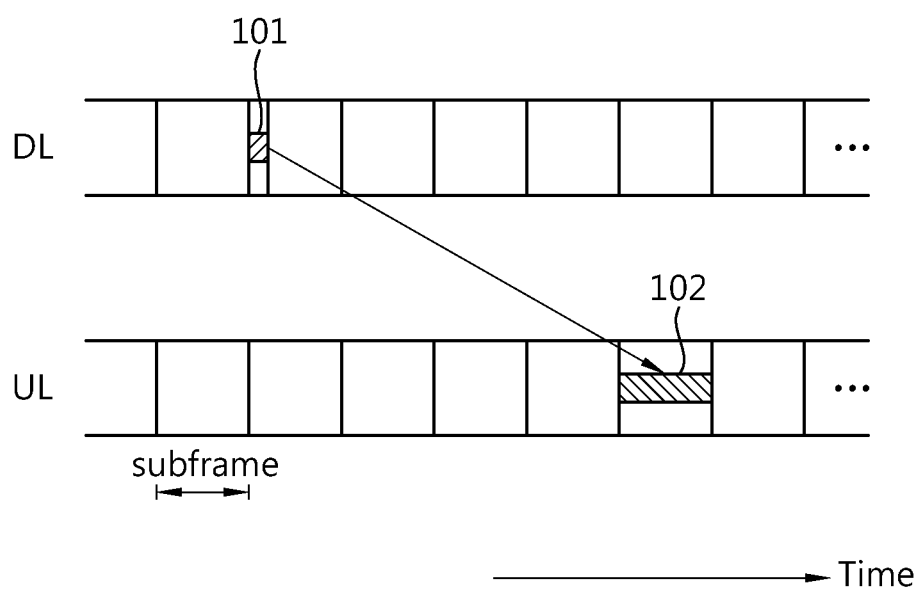
FIG. 3 is an exemplary diagram showing the transmission of uplink data.

FIG. 3 is an exemplary diagram showing the transmission of uplink data. A UE monitors a PDCCH in a DL subframe and receives UL resource allocation over a PDCCH 101. The UE transmits uplink data over a PUSCH 102 configured based on the UL resource allocation.

Figure 4:
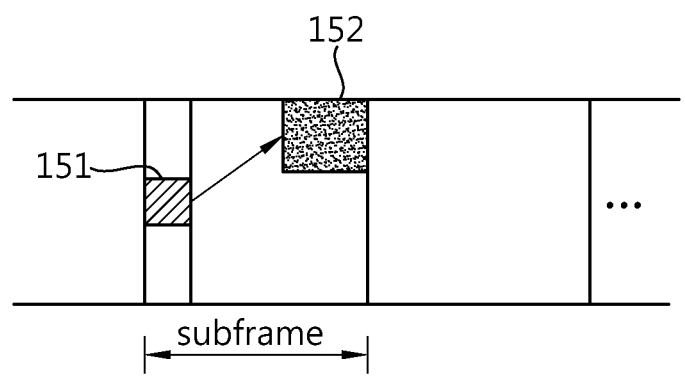
FIG. 4 is an exemplary diagram showing the reception of downlink data.

FIG. 4 is an exemplary diagram showing the reception of downlink data. A UE receives downlink data on a PDSCH 152 indicated by a PDCCH 151. The UE monitors the PDCCH 151 in a DL subframe and receives DL resource allocation over the PDCCH 151. The UE receives downlink data over the PDSCH 152 indicated by the DL resource allocation.

Figure 5:
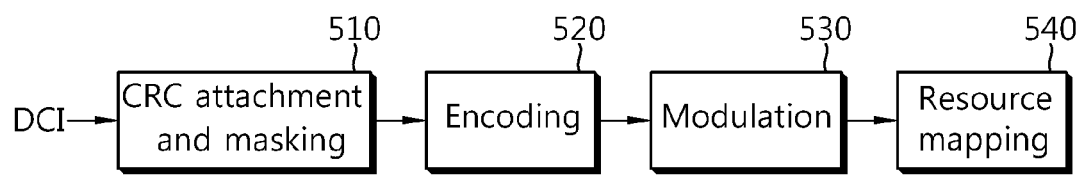
FIG. 5 is a block diagram showing the construction of a PDCCH.

FIG. 5 is a block diagram showing the construction of a PDCCH. A BS determines a PDCCH format based on DCI which will be transmitted to a UE, attaches a CRC (Cyclic Redundancy Check) to the DCI, and masks a unique identifier (this is called an RNTI (Radio Network Temporary Identifier) to the CRC according to the owner or usage of the PDCCH (block 510).

If the PDCCH is for a specific UE, an identifier (e.g., a C-RNTI (Cell-RNTI)) unique to the UE may be masked to the CRC. Alternatively, if the PDCCH is for a paging message, a paging indication identifier (e.g., a P-RNTI (Paging-RNTI)) may be masked to the CRC. If the PDCCH is for system information, a system information identifier (e.g., an SI-RNTI (system information-RNTI)) may be masked to the CRC. In order to indicate a random access response (i.e., a response to the transmission of a random access preamble by a UE), an RA-RNTI (random access-RNTI) may be masked to the CRC.

When the C-RNTI is used, the PDCCH carries control information for a specific UE (this is called UE-specific control information). When another RNTI is used, the PDCCH carries common control information which is received by all UEs within a cell or a plurality of UEs.

Coded data is generated by encoding the DCI having the CRC added thereto (block 520). Encoding includes channel encoding and rate matching.

The coded data is modulated, thereby generating modulation symbols (block 530).

The modulation symbols are mapped to physical REs (resource elements) (block 540). The modulation symbols are mapped to the respective REs.

Figure 6:
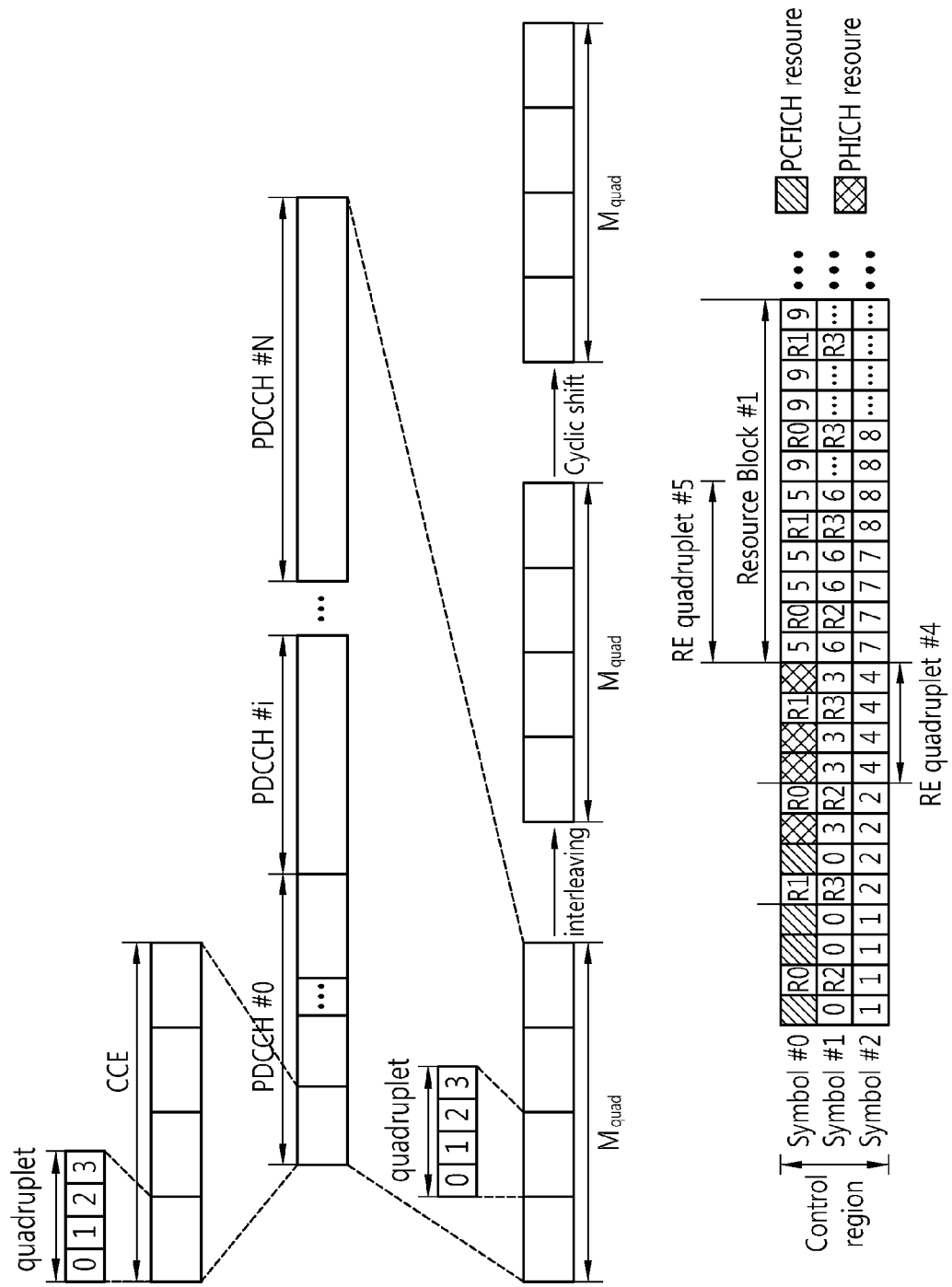
FIG. 6 shows an example of the resource mapping of PDCCHs.

FIG. 6 shows an example of the resource mapping of PDCCHs. For the resource mapping of PDCCHs, reference may be made to Section 6.8 of 3GPP TS 36.211 V8.5.0 (2008-12). R0 indicates the reference signal of a first antenna, R1 indicates the reference signal of a second antenna, R2 indicates the reference signal of a third antenna, and R3 indicates the reference signal of a fourth antenna.

A control region within a subframe includes a plurality of CCEs (control channel elements). The CCE is a logical allocation unit which is used to provide a PDCCH with the coding rate according to the state of a radio channel. The CCE corresponds to a plurality of REGs (resource element groups). The format of the PDCCH and the number of available bits of the PDCCH are determined according to the number of CCEs and the association of the coding rate provided by the CCEs.

One REG (indicated by a quadruplet) includes four REs, and one CCE includes 9 REGs. In order to configure one PDCCH, {1, 2, 4, 8} CCEs may be used. The {1, 2, 4, 8} is called a CCE aggregation level.

A control channel including one or more CCEs performs interleaving in unit of REGs, and the control channel is mapped to physical resources after cyclic shift based on a cell ID is performed.

Figure 7:
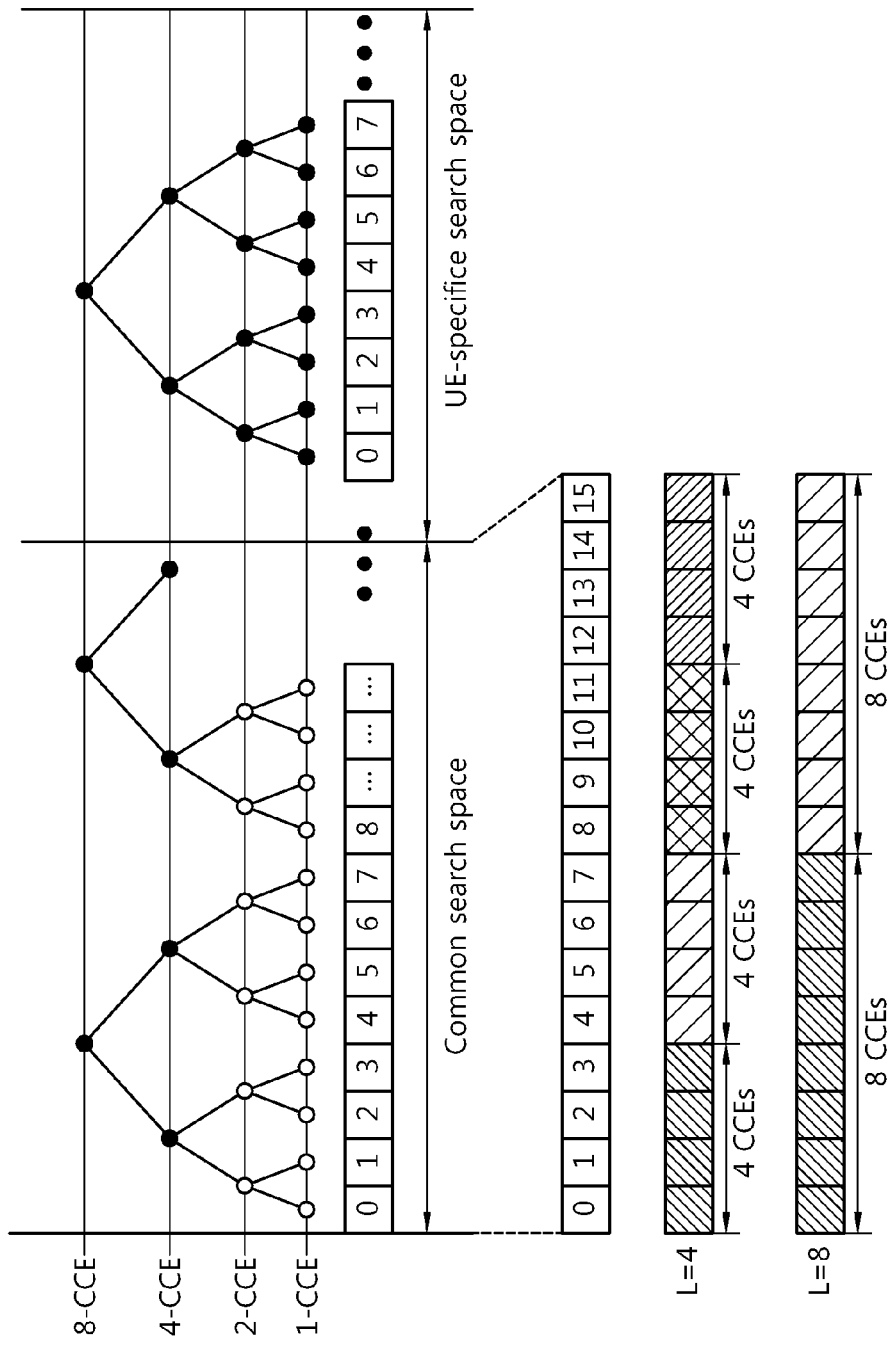
FIG. 7 is an exemplary diagram showing the monitoring of a PDCCH.

FIG. 7 is an exemplary diagram showing the monitoring of a PDCCH. For the monitoring of PDCCHs, reference may be made to Section 9 of 3GPP TS 36.213 V8.5.0 (2008-12). In 3GPP LTE, blind decoding is used in order to detect a PDCCH. Blind decoding is a method of demasking a desired ID to the CRC of a received PDCCH (this is called a candidate PDCCH) and determining whether the received PDCCH is its own control channel by checking a CRC error. A UE does not know its own PDCCH is transmitted using which CCE aggregation level or which DCI format at which place within a control region.

A plurality of PDCCHs may be transmitted within one subframe. A UE monitors a plurality of PDCCHs for each subframe. Here, monitoring means that a UE attempts to decode a monitored PDCCH according to the format of the PDCCH.

In 3GPP LTE, in order to reduce a load due to blind decoding, search spaces are used. The search space may be referred to as the monitoring set of CCEs for a PDCCH. A UE monitors a PDCCH within a relevant search space.

The search space is divided into a common search space and a UE-specific search space. The common search space is a space in which a PDCCH having common control information is searched for. The common search space includes 16 CCEs having CCE indices 0 to 15 and supports a PDCCH having {4, 8} CCE aggregation levels. The UE-specific search space supports a PDCCH having {1, 2, 4, 8} CCE aggregation levels.

Table 1 below shows the number of PDCCH candidates monitored by a UE.

TABLE 1

| Search Space Type | Aggregation level L | Size [in CCEs] | Number of PDCCH candidates | DCI format |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of the search space is determined by Table 1, and the starting position of the search space is differently defined in the common search space and the UE-specific search space. The starting position of the common search space is fixed irrespective of the subframe of the starting position, but the starting position of the UE-specific search space may be different for each subframe according to a UE ID (e.g., a C-RNTI) or a slot number within a radio frame or both. When the starting position of the UE-specific search space is within the common search space, the UE-specific search space and the common search space overlap with each other.

A multiple carrier system is now described.

A 3GPP LTE system supports a case where a DL bandwidth and a UL bandwidth are differently set, but a precondition therefor is one carrier. It means that 3GPP LTE supports a case where a downlink bandwidth and an uplink bandwidth are equal to each other or different from each other in the state in which one carrier is defined for downlink or uplink. For example, in a 3GPP LTE system, a maximum of 20 MHz is supported and a UL bandwidth and a DL bandwidth may be different from each other, but only one carrier is supported for uplink and downlink.

A spectrum aggregation (or a bandwidth aggregation, also called a carrier aggregation) supports a plurality of carriers. The spectrum aggregation is introduced in order to support an increased throughput, prevent an increase of the costs due to the use of wideband RF (radio frequency) devices, and guarantee compatibility with the existing system. For example, if 5 carriers are allocated as the granularity of a carrier unit having a 20 MHz bandwidth, a maximum of a 100 MHz bandwidth can be supported.

The spectrum aggregation may be divided into a contiguous spectrum aggregation in which the aggregation is performed between continuous carriers in the frequency domain and a non-contiguous spectrum aggregation in which the aggregation is performed between discontinuous carriers. The number of aggregated carriers in downlink and the number of aggregated carriers in uplink may be differently set. A case where the number of downlink carriers is equal to the number of uplink carriers is called a symmetric aggregation, and a case where the number of downlink carriers is different from the number of uplink carriers is called an asymmetric aggregation.

Multiple carriers may have different sizes (i.e., bandwidths). For example, assuming that 5 carriers are used to compose a 70 MHz band, the 5 carriers may have a construction, such as a 5 MHz carrier (carrier #0)+a 20 MHz carrier (carrier #1)+a 20 MHz carrier (carrier #2)+a 20 MHz carrier (carrier #3)+a 5 MHz carrier (carrier #4).

A multiple carrier system hereinafter refers to a system supporting multiple carriers based on the spectrum aggregation. In the multiple carrier system, the contiguous spectrum aggregation or the non-contiguous spectrum aggregation or both may be used. Furthermore, either the symmetric aggregation or the asymmetric aggregation may be used.

For clarity, the transmission of a PDCCH-PDSCH pair is taken into account in a downlink carrier, but a person having ordinary skill in the art may easily apply the transmission of the PDCCH-PDSCH pair to the transmission of a PDCCH-PUSCH pair.

Figure 8:
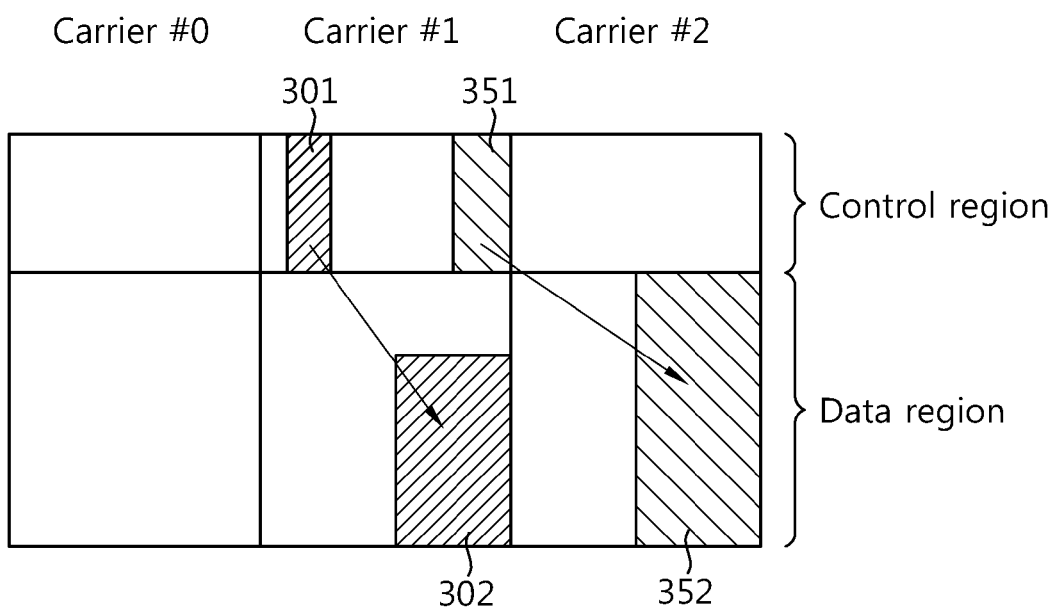
FIG. 8 shows an example of separate coding.

FIG. 8 shows an example of separate coding. Separate coding means that one PDCCH can carry downlink allocation for a PDSCH for one carrier. That is, the PDCCH and the PDSCH correspond to each other in a one-to-one way.

A first PDCCH 301 carries downlink allocation for a first PDSCH 302. It means that the first PDCCH 301 and the first PDSCH 302 are transmitted over the same carrier, thereby being capable of providing backward compatibility with the existing LTE.

A second PDCCH 351 carries downlink allocation for a second PDSCH 352. It means that the second PDCCH 351 and the second PDSCH 352 are transmitted through different carriers. The DCI of the second PDCCH 351 may include an indicator for a carrier #2 over which the second PDSCH 352 is transmitted.

Figure 9:
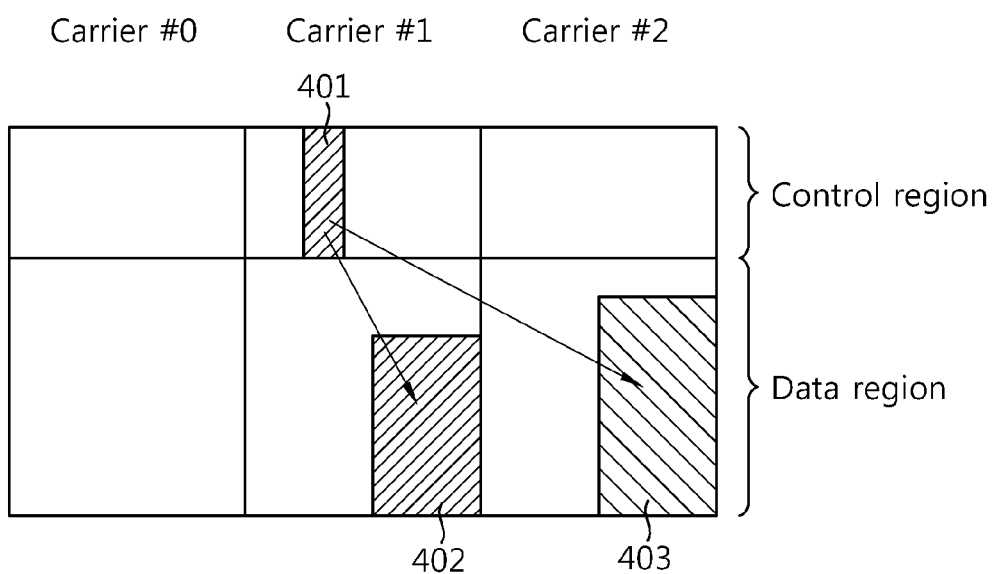
FIG. 9 shows an example of joint coding.

FIG. 9 shows an example of joint coding. Joint coding refers to that one PDCCH can carry downlink allocation for the PDSCH of one or more carriers.

A PDCCH 401 carries downlink allocation for the PDSCH 402 of a carrier #1 and the PDSCH 403 of a carrier #2.

The transmission and monitoring of a control channel, proposed by the present invention, are described on the basis of the above-described PDCCH structure.

It is hereinafter assumed that there are a total of three downlink carriers. However, the number of downlink carrier is only illustrative and the number of carriers is not limited.

Figure 10:
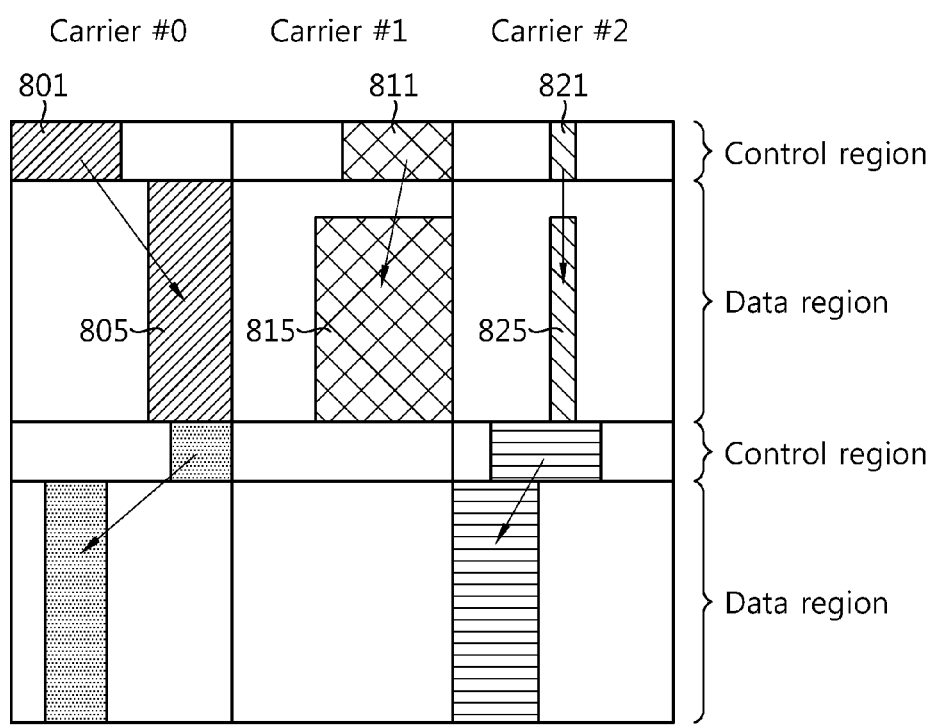
FIG. 10 shows the monitoring of a PDCCH according to an embodiment of the present invention.
Figure 10:
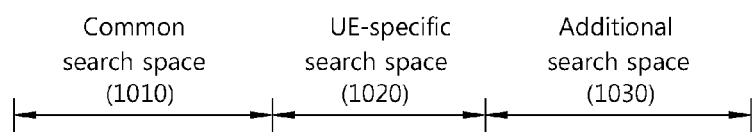

FIG. 10 shows the monitoring of a PDCCH according to an embodiment of the present invention. A first PDCCH 801, a second PDCCH 811, and a third PDCCH 821 are transmitted over respective carriers #0, #1, and #2. The first PDCCH 801 carries the resource allocation of a first PDSCH 805 on the carrier #0, the second PDCCH 811 carries the resource allocation of a second PDSCH 815 on the carrier #1, and the third PDCCH 821 carries the resource allocation of a third PDSCH 825 on the carrier #2.

A legacy UE supporting the conventional 3GPP LTE monitors a PDCCH in a common search space 1010 and a UE-specific search space 1020. In the common search space 1010 and the UE-specific search space 1020, not only the legacy UE, but also a UE supporting multiple carriers (called an LTE-A UE) can monitor the PDCCH.

An additional search space 1030 is defined for an LTE-A UE, an LTE-UE group and/or all UEs which support multiple carriers or a new function, such as relay. For example, in K CCE columns, CCEs having indices 0 to 15 are allocated to the common search space 1010, CCEs having indices 16 to M are allocated to the UE-specific search space 1020, and CCEs having indices M+1 to K−1 are allocated to the additional search space 1030.

In the figure, the common search space 1010, the UE-specific search space 1020, and the additional search space 1030 look like being divided on logical CCE columns, but the additional search space 1030 may overlap with the common search space 1010 or the UE-specific search space 1020 or both.

The size of the additional search space 1030 may be defined according to each CCE aggregation level. Assuming that there are N available CCE aggregation levels, the number of CCE aggregation levels equal to or smaller than N may be applied to the additional search space 1030. The number of PDCCH candidates for each CCE aggregation level L may be determined by the number of CCEs which are used in the additional search space 1030. For example, when K CCEs are allocated to the additional search space 1030, the size S of the additional search space 1030 may be defined as 'floor(K/L)' according to the CCE aggregation level L.

Hereinafter, a floor(x) is a function indicating the greatest integer smaller than x, a ceil(x) is a function indicating the smallest integer greater than x, and a round(x) is a rounding-off function of x.

The starting position of the additional search space 1030 may be defined on the basis of the starting position of the common search space 1010 or the starting position of the UE-specific search space 1020 or both. For example, the starting position of the additional search space 1030 may be defined from the CCE#16 which is a CCE immediately following the last CCE of the common search space 1010. Alternatively, the starting position of the additional search space 1030 may be defined on the basis of a certain CCE index on the UE-specific search space 1020.

In order to mitigate inter-cell interference, the size or the starting position of the additional search space 1030 may be differently set according to each cell.

In order to avoid overlapping with the UE-specific search space 1020, all CCE columns (or the remaining CCE columns other than the common search space 1010) may be classified into Q subsets, and the subsets may be allocated to the UE-specific search space 1020 or the additional search space 1030. Alternatively, the additional search spaces 103 may be first designated on all the CCE columns, and the UE-specific search space 1020 may be designated in the remaining parts.

The starting position of the additional search space 1030 may be fixed or may be changed according to each subframe. The starting position of the additional search space 1030 may be changed on the basis of a UE ID, a cell ID, the number of multiple carriers and/or the index of a reference carrier.

The additional search space 1030, like the common search space 1010, may be a search space for a common PDCCH which carries additional common control information or may be a search space for a PDCCH which carries UE-specific control information.

Figure 11:
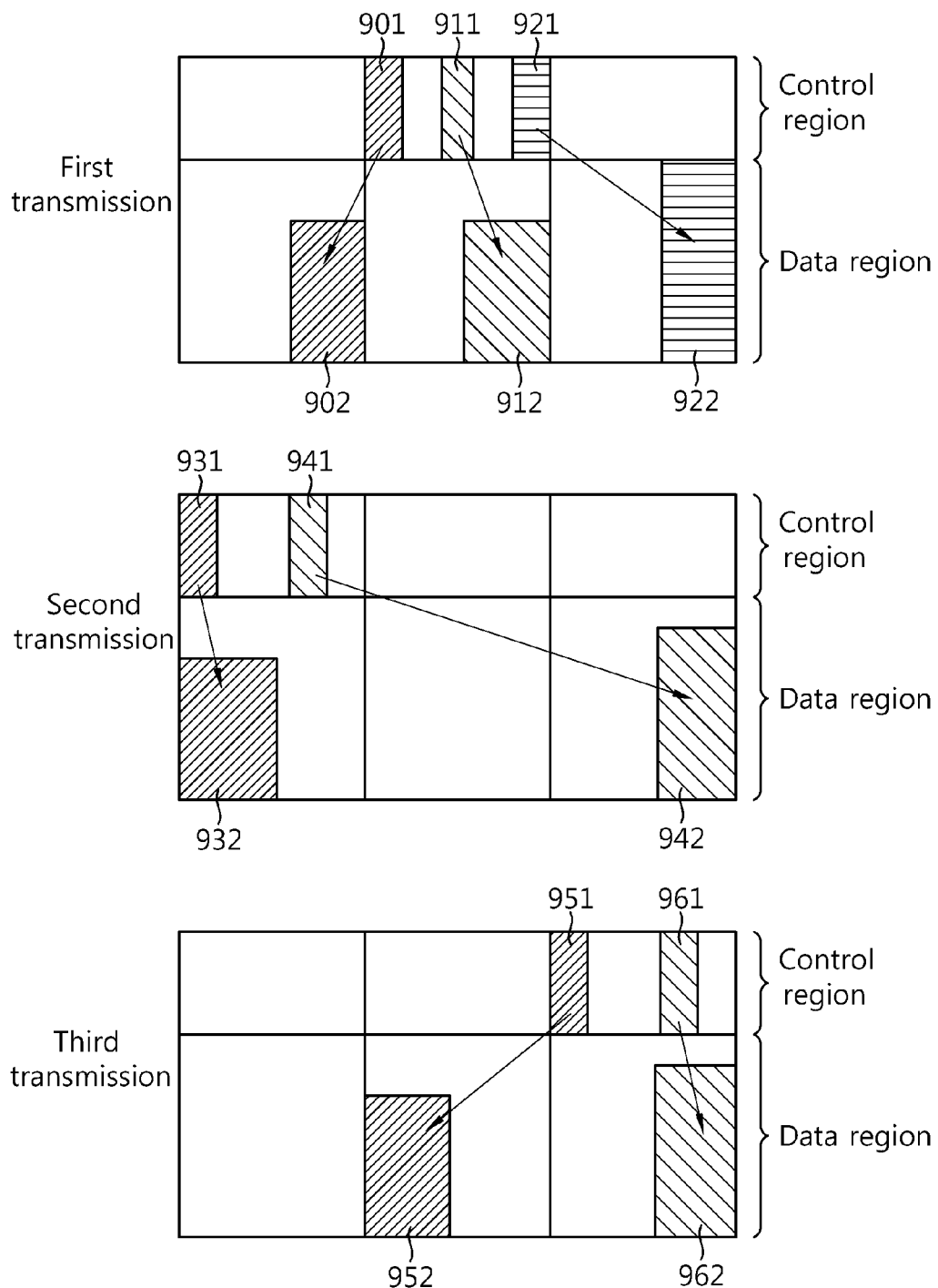
FIG. 11 shows the monitoring of a PDCCH when carrier hopping is used.

FIG. 11 shows the monitoring of a PDCCH when carrier hopping is used. A reference carrier is a carrier which has been configured for a UE, a cell, or a UE group to monitor a PDCCH. The reference carrier may be configured a cell-specific way, a UE-specific way, or a UE group-specific way. A plurality of reference carriers may be configured for each UE. For example, assuming that a system includes a total of 5 carriers, a BS only 3 of the 5 carriers may be allocated to a UE, and one or more of the 3 allocated carriers may be designated as UE-specific reference carriers.

It is assumed that the reference carrier is initially set as a carrier #1. A first PDCCH 901, a second PDCCH 911, and a third PDCCH 921 are transmitted through the reference carrier. The first PDCCH 901 carries the resource allocation of a first PDSCH 902 on a carrier #0. The second PDCCH 911 carries the resource allocation of a second PDSCH 912 on a carrier #1. The third PDCCH 921 carries the resource allocation of a third PDSCH 922 on a carrier #2.

In second transmission, the reference carrier is switched to the carrier #0. That is, a UE monitors its own PDCCH in the carrier #0.

In third transmission, the reference carrier is switched to the carrier #2.

The DCI of a PDCCH includes a carrier index or a reference carrier index. Accordingly, the DCI can inform that the relevant PDCCH includes resource allocation for the PDSCH of what carrier. Alternatively, a UE can determine whether a PDCCH using a relevant CCE includes resource allocation for the PDSCH of what carrier on the basis of the resources of the PDCCH. For example, if a first PDCCH is detected in a CCE index 0, a second PDCCH is detected in a CCE index 8, and a second PDCCH is detected in a CCE 40, the first PDCCH is determined as resource allocation for the PDSCH of the carrier #0, the second PDCCH is determined as resource allocation for the PDSCH of the carrier #1, and the third PDCCH is determined as resource allocation for the PDSCH of the carrier #2.

In blind decoding, a UE does not know that its own PDCCH is transmitted within a relevant subframe and how many PDCCHs are allocated to the UE. Accordingly, a BS may inform the UE of information about control channels which are allocated to the UE during a relevant transmission period (a subframe or a plurality of subframes). The information may include the number of allocated control channels, the number of search spaces and/or a reference carrier index. The BS may inform the UE of the information using a PDCCH or an RRC message on the above-described additional search spaces or part of system information.

In accordance with the existing 3GPP LTE, if a CRC error is not detected by performing blind decoding for one DCI format, decoding for the DCI format is considered as being successful and thus blind decoding is no longer performed. As in the first transmission of FIG. 11, however, if the three PDCCHs 901, 911, and 912 for one UE are transmitted through one carrier and the three PDCCHs 901, 911, and 912 have the same DCI format, the above method is problematic.

Figure 12:
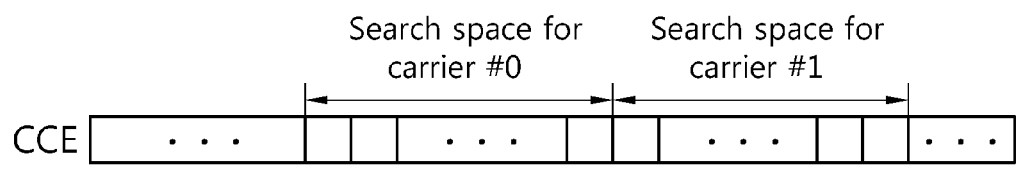
FIG. 12 shows the monitoring of a PDCCH using a plurality of search spaces.

FIG. 12 shows the monitoring of a PDCCH using a plurality of search spaces. A plurality of search spaces is defined so that one UE can monitor a plurality of PDCCHs within the control region of a subframe. For example, a search space for a carrier #0 used in PDCCH monitoring for the carrier #0 (a first search space) and a search space for a carrier #1 used in PDCCH monitoring for the carrier #1 (a second search space) are defined. Here, the search space for the carrier #0 may use the existing UE-specific search space 1020 without change, and the search space for the carrier #1 may use the additional search space 1030 without change. Alternatively, the search space for the carrier #1 may also use the existing UE-specific search space without change.

When a plurality of PDCCHs is transmitted within one subframe through a reference carrier, the number of search spaces may be defined as the number of PDCCHs which are transmitted to one UE. When three PDCCHs for three carriers are transmitted, first, second, and third search spaces are defined.

When a plurality of search spaces for a plurality of PDCCHs is defined in one carrier, the starting position or size of each search space may be defined on the basis of a carrier index, a carrier index offset, the number of multiple carriers and/or an offset of the number of multiple carriers. The carrier index may be the logical index or the physical index of a candidate carrier through which a UE can receive a PDCCH.

When an additional search space is defined in multiple carriers, the starting position of the additional search space may be defined on the basis of a carrier index, a carrier index offset, the number of multiple carriers and/or an offset of the number of multiple carriers. The carrier index may be the logical index or the physical index of a candidate carrier through which a UE can receive a PDCCH.

The search space may be configured in an interleaving form. Interleaving means that the CCE index of a search space monitored by a UE is interleaved. An interleaved CCE column may include a common search space or may not include a common search space.

In the control region of a subframe, the number of available modulation symbols (i.e., the number of REs that may be used for PDCCH transmission) is based on the bandwidth of the relevant subframe and the size of a control region (i.e., the number of OFDM symbols allocated to the control region). In the subframe, the interleaved search space of each CCE aggregation level can be calculated by dividing the number of REs which may be used for PDCCH transmission by a CCE aggregation level L={1, 2, 4, 8}.

It is assumed that in an i-th subframe, the number of REs that may be used for PDCCH transmission is Xi. The length x of an interleaving sequence for each CCE aggregation level L may be defined as 'ceil{Xi/36L}, x=floor{Xi/36L}, or x=round{Xi/36L}'. Xi may be the number of the remaining REs from which the number of REs included in all CCE columns or the number of REs (i.e., 16) included in a common search space in all the CCE columns has been subtracted. When the size or starting position of the search space is calculated, the index of the interleaving sequence may be multiplied by the CCE aggregation level L.

FIG. 13 shows an example of an interleaved search space. Assuming that a CCE index on a CCE column before interleaving is k and a CCE index on the CCE column after interleaving is k', k'=I(k), where I(k) indicates an interleaving sequence. When the interleaving sequence is defined, restrictions may be placed so that the distance between CCE indices before interleaving is distant by one or more candidate PDCCHs after interleaving.

In accordance with the prior art, after the starting position of each CCE aggregation level is defined within a UE-specific search space, the UE sequentially performs blind decoding from the starting position by the number of candidate PDCCHs. In accordance with the proposed interleaved search space, blind decoding may be performed in various ways. Furthermore, a plurality of PDCCHs for one UE is not concentrated on a specific CCE index. Accordingly, an error in the reception of a PDCCH due to a degraded channel environment can be reduced, and a diversity gain can be obtained.

Figure 14:
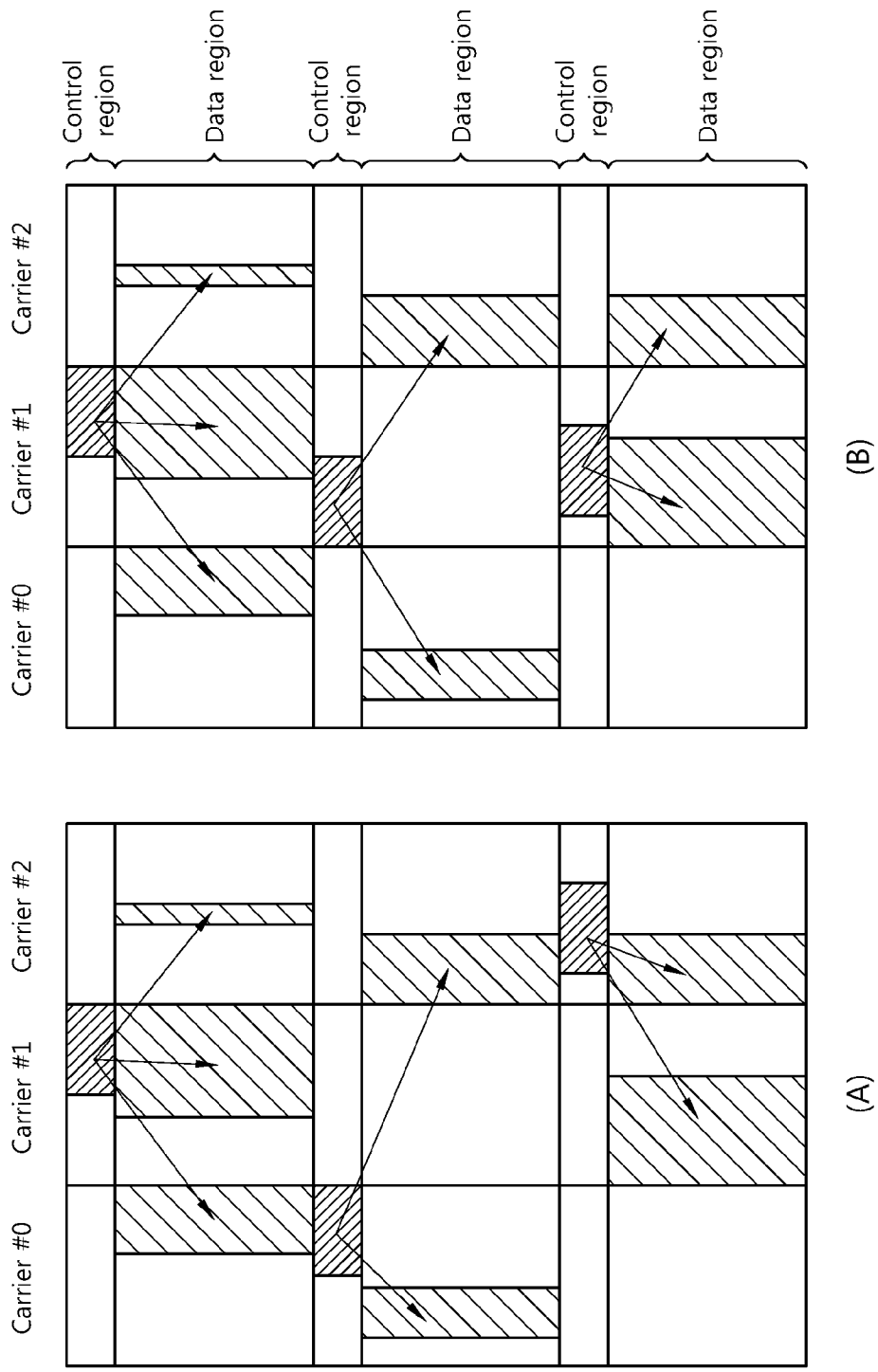
FIG. 14 shows an example in which a joint-coded PDCCH is transmitted.

FIG. 14 shows an example in which a joint-coded PDCCH is transmitted. A subfigure (A) of FIG. 14 shows that a carrier used for PDCCH transmission (i.e., a reference carrier) are semi-statically configured, and a subfigure (B) of FIG. 14 shows that a reference carrier is switched periodically or aperiodically according to a carrier hopping method.

If a UE knows a carrier on which its own PDCCH will be monitored, the UE can monitor a joint-coded PDDCH like in the existing method. However, the size of a payload of the joint-coded PDCCH in a multiple carrier system may be larger than the size of a payload of a PDCCH in a legacy system. Accordingly, more CCE aggregation levels than the existing {1, 2, 4, 8} may be required.

Added CCE aggregation levels may be randomly set like {10, 12, 20, . . . }. In order to support the CCE aggregation levels of a tree structure, such as that shown in FIG. 7, it is better that the added CCE aggregation levels may have a $2^n$ structure, such as {16, 32, . . . }. In the latter structure, it is preferred that the added CCE aggregation levels consist of a combination of the existing CCE aggregation levels {1, 2, 4, 8}. This is because if a search space for additional CCE aggregation levels greater than 8 is allocated to consecutive CCE indices like in the existing CCE aggregation levels, the scheduling of PDCCHs may be limited.

Figure 15:
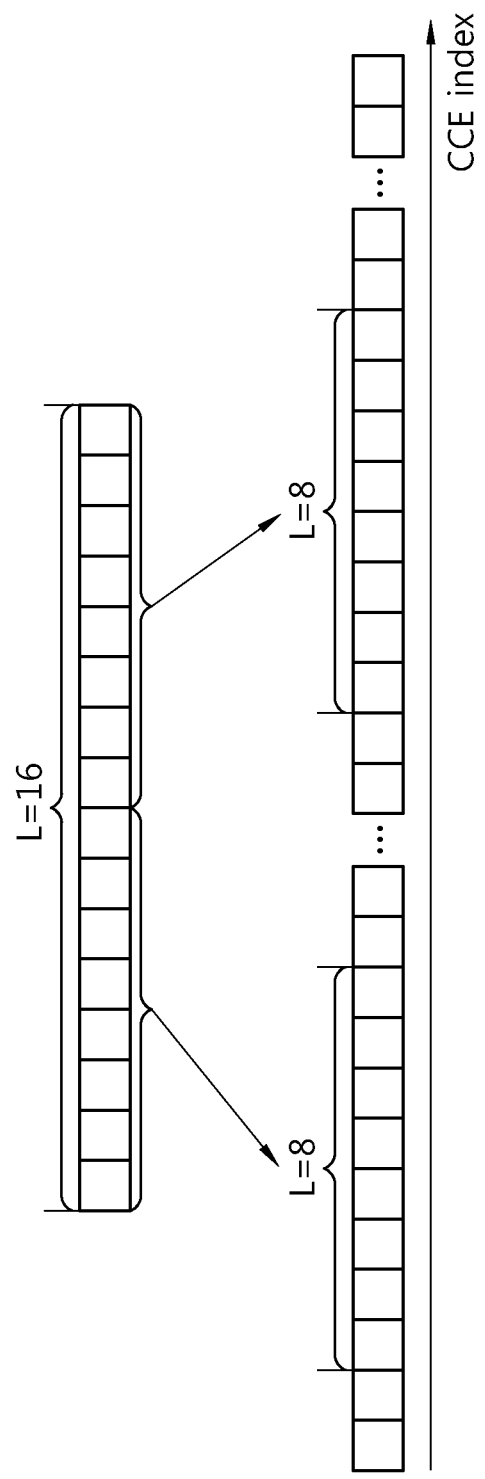
FIG. 15 shows an example of the construction of added CCE aggregation levels.

FIG. 15 shows an example of the construction of added CCE aggregation levels. If CCE aggregation levels larger than the existing CCE aggregation levels {1, 2, 4, 8} are used, a search space for the CCE aggregation levels may not be allocated to contiguous CCEs, but may be allocated to non-contiguous CCE or contiguous CCE which is composed of the existing CCE aggregation levels {1, 2, 4, 8}. That is, the search space for the added CCE aggregation levels is classified for the existing CCE aggregation level and allocated.

For example, a CCE aggregation level L=16 may consist of two CCE aggregation levels each having L=8. This method is advantageous in that a joint-coded PDCCH can be transmitted through a single carrier and no restrictions are put on the scheduling of a PDCCH using the existing CCE aggregation level.

In order to construct one large CCE aggregation level using a plurality of small CCE aggregation levels as described above and in order for a UE to perform blind decoding based on the above method, a variety of methods are possible.

A PDDCH consisting of CCE aggregation levels greater than 8 is classified in the unit of CCE aggregation levels of 8 or less (this is called a segmented CCE aggregation level) and allocated search spaces. In order to compose a CCE aggregation level L=16, two segmented CCE aggregation levels each L=8 are used. Here, a search space may be allocated to the first segmented CCE aggregation level like in the existing method, and the second segmented CCE aggregation level may be allocated to a CCE index spaced apart from the first segmented CCE aggregation level by an offset. The offset may depend on the number of effective CCEs within a subframe or the number of available carriers. Alternatively, the offset may have a preset value.

Different starting positions may be defined for a plurality of segmented CCE aggregation levels. The starting position of a search space may be defined for a first segmented CCE aggregation level like in the existing method, and the starting position of a search space may be defined based on a different factor for a second segmented CCE aggregation level.

When the search space is constructed, the number of candidate PDCCHs may be defined to be smaller than the number of candidate PDCCHs in a legacy system in order to reduce blind decoding complexity in a UE.

If the CCE aggregation levels have a structure, such as {10, 12, 20 . . . } not satisfying the tree structure, the CCE aggregation levels may be composed of a combination of the existing CCE aggregation levels {1, 2, 4, 8}. In order to construct the CCE aggregation levels L=10, the CCE aggregation levels L=8 and the CCE aggregation levels L=2 are used.

The search space using the added CCE aggregation levels may be the above-described additional search space 1030. The conventional CCE aggregation levels {1, 2, 4, 8} are used in the common search space 1010 and the UE-specific search space 1020, and the CCE aggregation levels greater than 8 are used only in the additional search space 1030.

Figure 16:
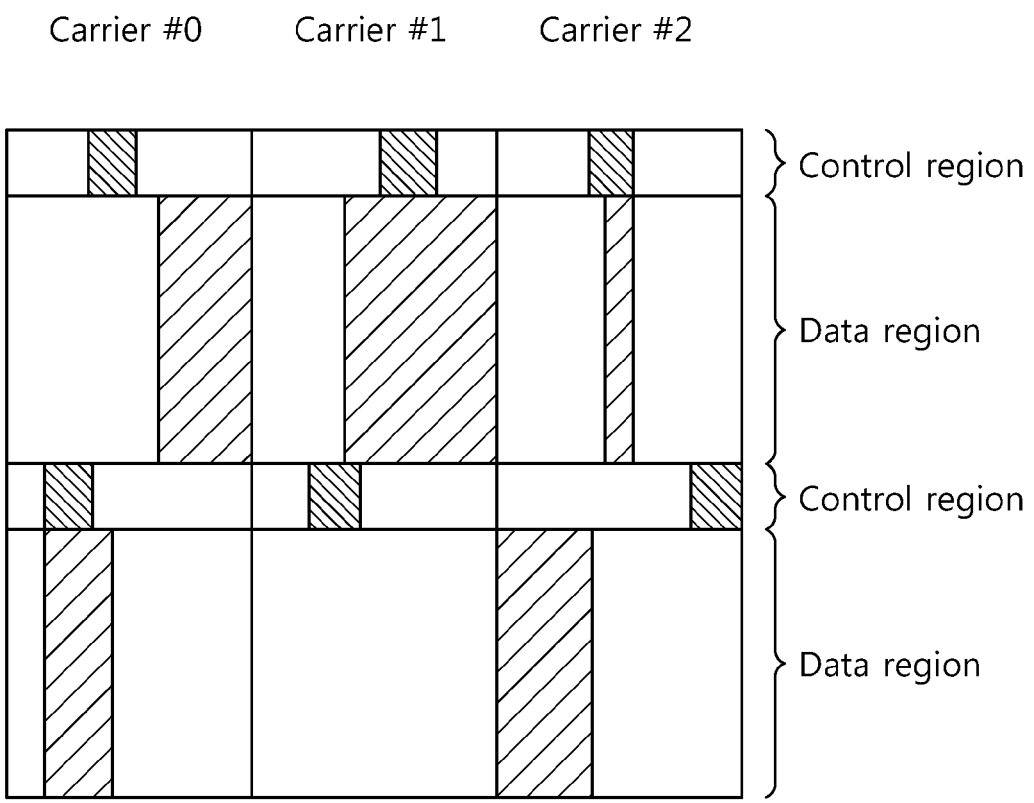
FIG. 16 shows the transmission of a joint-coded PDCCH over a plurality of carriers.

FIG. 16 shows the transmission of a joint-coded PDCCH over a plurality of carriers. Here, the PDSCH is scheduled over the plurality of carriers. DCI for a plurality of PDSCHs transmitted over the plurality of carriers is subjected to joint coding to one PDCCH, and the joint-coded PDCCH is transmitted over the plurality of carriers.

When the joint-coded PDCCH is transmitted over the plurality of carriers, CCEs used to transmit the PDCCH may be segmented by the number of used carriers, and CCE interleaving may be performed per carrier. Furthermore, a UE may perform de-interleaving by carrier, collect CCEs distributed into the carriers, and then decode the PDCCH.

When a plurality of carriers is transmitted over a joint-coded PDDCH, there is a need for a new interleaving method which is capable of mapping CCEs for constructing the joint-coded PDCCH to physical resources on the plurality of carriers.

A unit inputted to each carrier may be a CCE or an REG according to a CCE aggregation level. For example, if the CCE aggregation level is 1, the CCE or the REG is inputted to each carrier for each REG. If the number of carriers used in CCE aggregation levels is a multiple, the CCE or the REG may be inputted to for each CCE.

CCES composing a joint-coded PDCCH may be allocated to all carriers equally to the highest degree according to the number of carriers.

Figure 17:
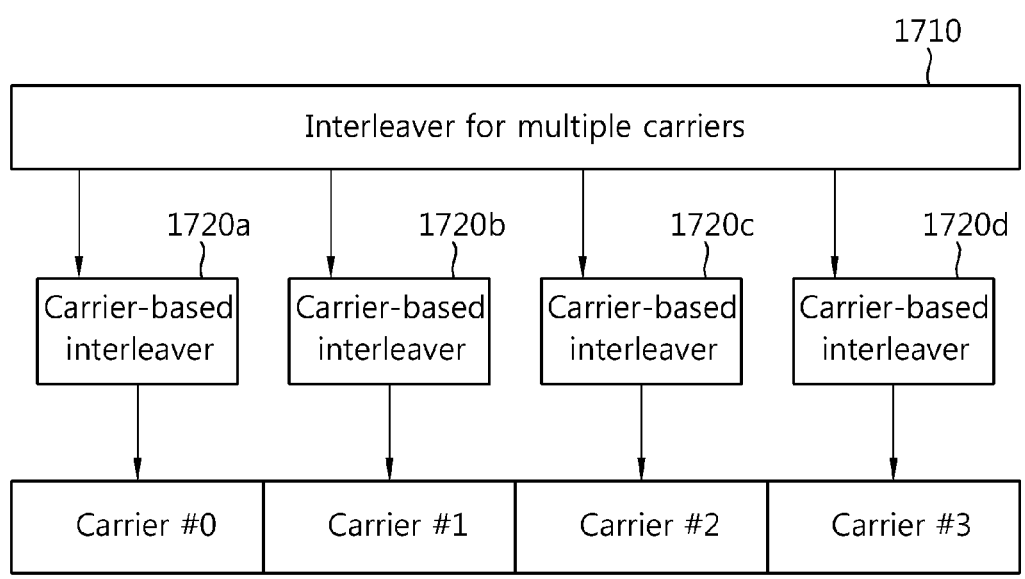
FIG. 17 shows an example of CCE-to-RE mapping in multiple carriers.

FIG. 17 shows an example of CCE-to-RE mapping in multiple carriers. An interleaver 1710 for multiple carriers classifies all CCE columns, forming a joint-coded PDCCH, by carriers and sends a relevant CCE or REG to each of carrier-based interleavers 1720a, 1720b, 1720c, and 1720d. Each of the carrier-based interleavers 1720a, 1720b, 1720c, and 1720d performs CCE interleaving by each carrier. In this case, the same method as the interleaving method of the existing 3GPP LTE may be used.

Figure 18:
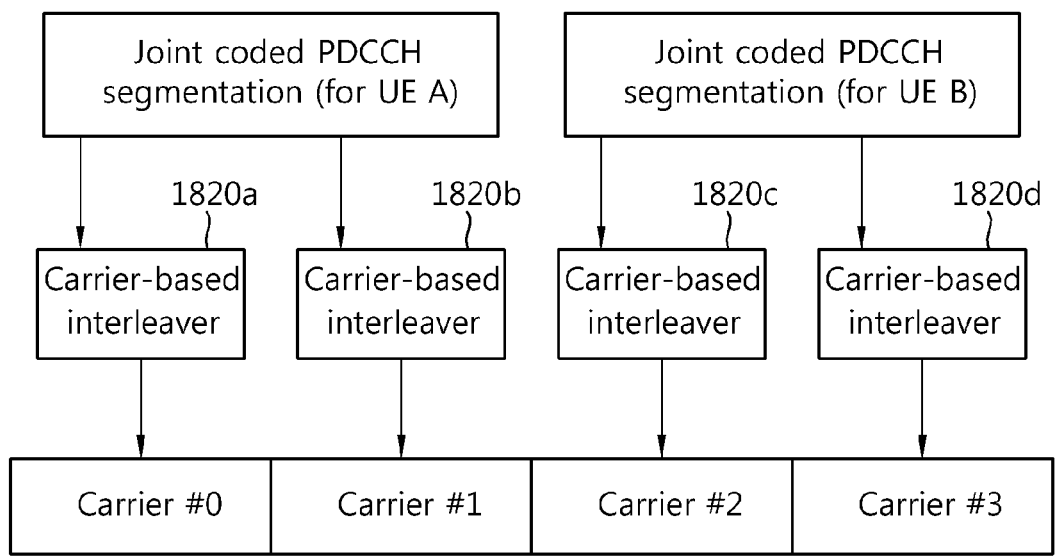
FIG. 18 shows another example of CCE-to-RE mapping in multiple carriers.

FIG. 18 shows another example of CCE-to-RE mapping in multiple carriers. In this example, as compared with the example of FIG. 17, the CCEs of a joint-coded PDCCH are segmented according to each UE and then transmitted to relevant carrier-based interleavers 1820a, 1820b, 1820c, and 1820d.

Not only a PDCCH may be segmented according to UE, but also the PDCCH may be segmented in relation to UEs using the same carrier.

The CCE segmentation rule of a PDDCH joint-coded according to each UE is now described as an example. M is the number of REGs used in a joint-coded PDCCH, N is the number of used carriers, and A=M/M.

If M is a multiple of N, the number of REGs allocated to each carrier is identically A. If A is a multiple of 9, each carrier is allocated according to each CCE.

If M is not a multiple of N, the number of REGs allocated to each carrier is different, and one of two kinds of segmentations below may be used.

First, i=ceil(A) and i REGs are allocated to each of (N−1) carriers. The remaining M−i*floor(M/i) REGs are allocated to the remaining one carrier. The carrier index of the remaining one carrier may be the last index, the first index, or a certain index.

Second, j=floor(A), and j REGs are allocated to each of (N−1) carriers. The remaining M−j*floor(M/j) REGs are allocated to the remaining one carrier. The carrier index of the remaining one carrier may be the last index, the first index, or a certain index.

Figure 19:
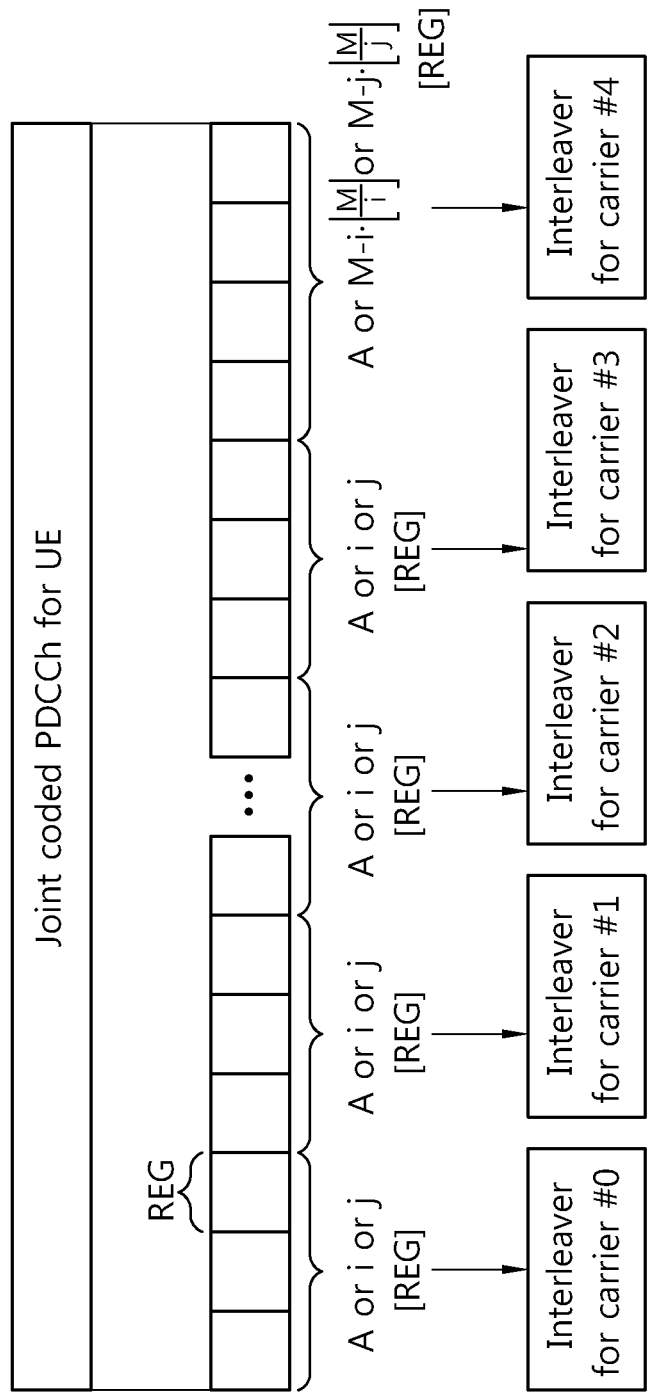
FIG. 19 shows two kinds of rules when the remaining REGs are allocated to the last carrier.

FIG. 19 shows two kinds of rules when the remaining REGs are allocated to the last carrier. When the index of a carrier to which the remaining REGs are allocated is previously designated, a BS does not need to inform a UE of the index. If the remaining REGs are allocated to a certain carrier, the BS may inform the UE of the index of a carrier to which the remaining REGs are allocated.

In a single carrier, a PDCCH can be decoded using only search spaces within a subframe. If a joint-coded PDCCH is transmitted over a plurality of carriers, however, PDCCH resources have to be collected over the plurality of carriers and the PDCCHs have to be decoded. In this case, it is difficult to utilize the structures of the existing search spaces. In order to utilize the structures of the existing search spaces, a new additional search space for the joint-coded PDCCH may be defined.

A UE using multiple carriers performs UE-based CCE-to-RE de-interleaving, collects PDCCH resources distributed into carriers for each REG or CCE by performing an inverse process of the PDDCH segmentation process, and decodes a joint-coded PDDCH. A BS may multiplex the joint-coded PDCCHs within an additional search space.

In the additional search space, used carriers may be constructed by the same UE. A UE may know the amount of PDCCH resources within a relevant search space based on the number of used carriers and the size of a control region of each carrier. The CCE index of the search space can be calculated based on the amount of resources.

The starting position of the additional search space may be defined on the basis of a carrier index.

The REG or CCE of the joint-coded PDDCH may be placed at the last one of CCE columns used by a legacy UE.

Figure 20:
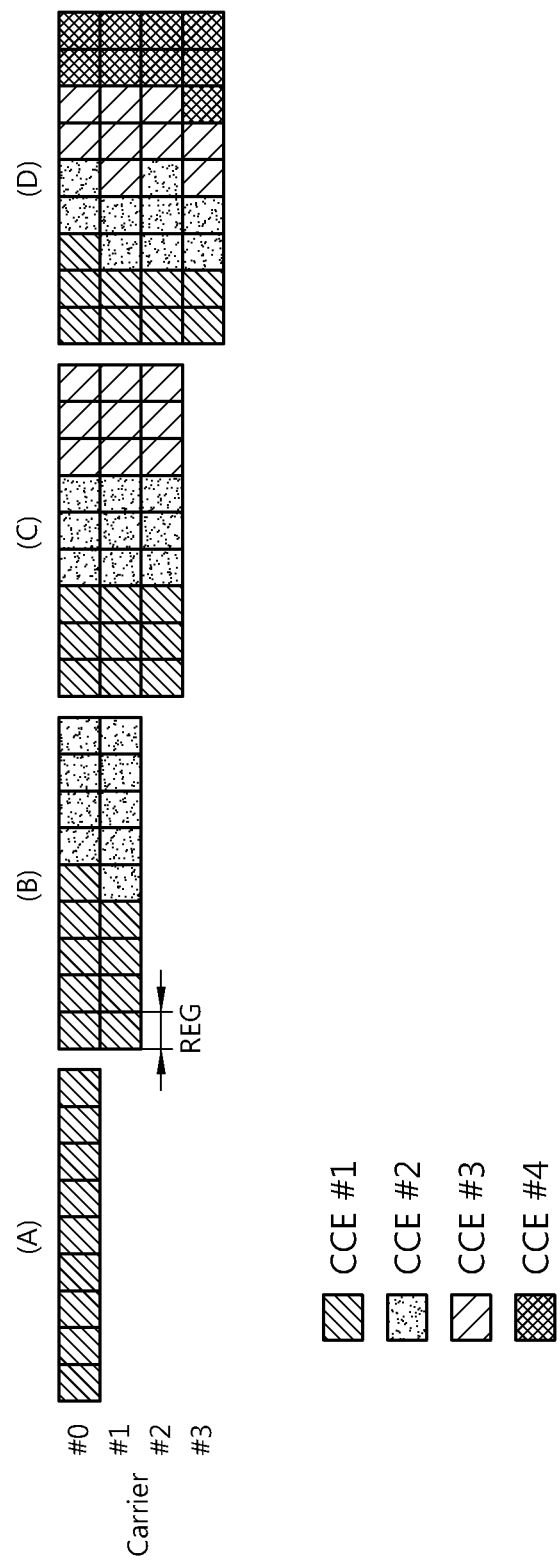
FIG. 20 shows an example of CCE structures in multiple carriers.

FIG. 20 shows an example of CCE structures in multiple carriers. In this example, assuming that four carriers #0 to #3 exist, A is a CCE structure when one carrier is used. B is a CCE structure when two carriers are used. C is a CCE structure when three carriers are used. D is a CCE structure when four carriers are used.

In all the CCE structures, 9 REGs are allocated to each carrier, thus composing a CCE unit. However, the number of REGs allocated by each carrier may not become a multiple of 9. That is, the number of REGs may not be allocated for each CCE.

In order to maintain the conventional CCE structure, restrictions may be imposed so that the CCE of a joint-coded PDCCH can be segmented according to each carrier. To this end, a CCE aggregation level used in the joint-coded PDCCH may be limited to a relatively great CCE aggregation level, such as 4 or higher.

Furthermore, when the unit in which the CCE is segmented according to each carrier is a CCE, CCE aggregation levels may be restricted to the conventional CCE aggregation levels {1, 2, 4, 8} or the CCE aggregation levels of a multiple of 2 in order to maintain the conventional tree structure of the search space.

Figure 21:
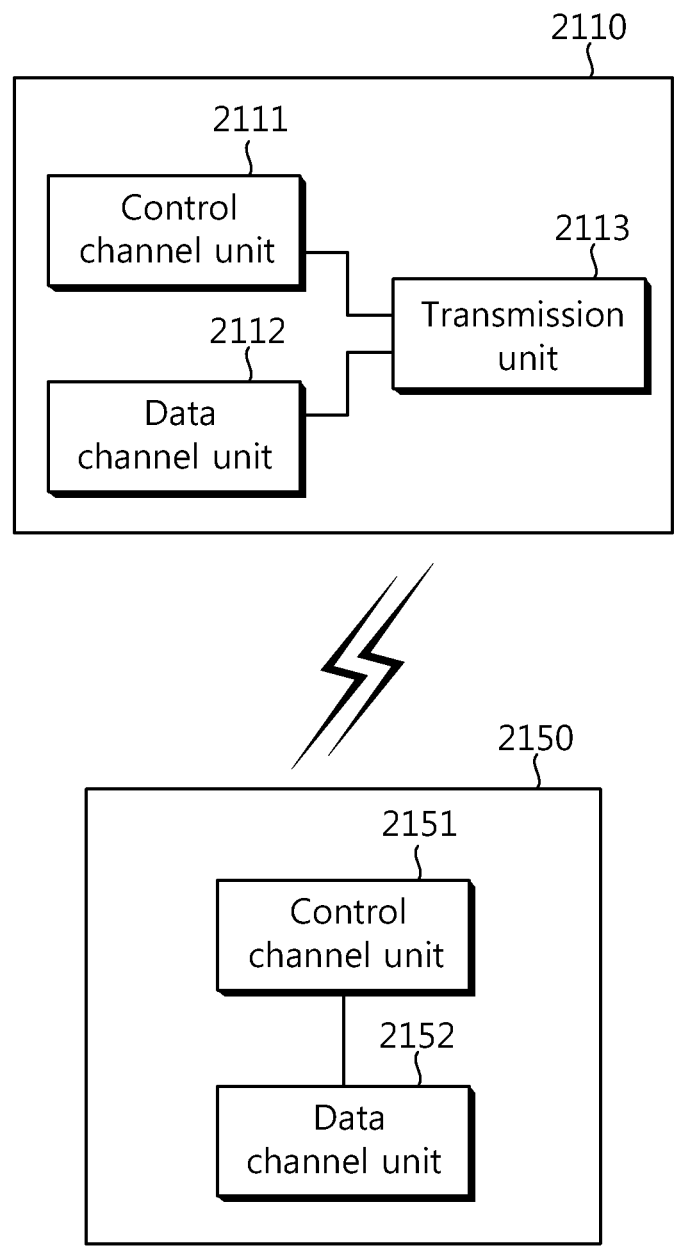
FIG. 21 is a block diagram showing a wireless communication system in which embodiments of the present invention are implemented.

FIG. 21 is a block diagram showing a wireless communication system in which embodiments of the present invention are implemented. A first wireless apparatus 2110 may be part of a BS, and a second wireless apparatus 2150 may be part of a UE.

The first wireless apparatus 2110 includes a control channel unit 2111, a data channel unit 2112, and a transmission unit 2113. The control channel unit 2111 is a functional medium for constructing the above-described control channels and mapping the control channels to the inside of a subframe. The data channel unit 2112 is a functional medium for constructing data channels on the basis of the resource allocation of the control channels. The transmission unit 2113 is a functional medium for transmitting the control channels or the data channels or both through at least one of a plurality of carriers.

The second wireless apparatus 2150 includes a control channel unit 2151 and a data channel unit 2152. The control channel unit 2151 is a functional medium for monitoring a control channel through at least one of a plurality of carriers. The data channel unit 2152 is a functional medium for transmitting or receiving data packets over data channels using resource allocation received over the control channel.

The control channel unit 2111, 2151 and the data channel unit 2112, 2152 may be implemented in hardware or may be a protocol implemented by a processor (not shown). The protocol may be stored in memory (not shown) and executed by the processor.

In the above-described exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and other steps may be included or one or more steps of the flowcharts may be deleted without affecting the scope of the present invention.

The above-described embodiments include various aspects of examples. Although all kinds of possible combinations for representing the various aspects may not be described, a person having ordinary skill in the art will understand that other possible combinations are possible. Accordingly, the present invention may be said to include all other replacement, modifications, and changes which fall within the scope of the claims.

The invention claimed is:

1. A wireless apparatus for a multiple carrier system, comprising:
    a memory; and
    a processor co-operatively connected to the memory and configured to
        monitor a first control channel and a second control channel transmitted over at least one of a plurality of carriers;
        detect the first control channel in at least one of a common search space of a first carrier and a User Equipment (UE)-specific search space of the first carrier;
        detect the second control channel in a UE-specific search space of a second carrier; and
        transmit or receive a data packet on a data channel using a resource allocation received on at least one of the first control channel or the second control channel.

2. The wireless apparatus of claim 1, wherein a starting position of the UE-specific search space of the second carrier is defined based on an index of the second carrier.

3. The wireless apparatus of claim 1, wherein a starting position of the UE-specific search space of the second carrier is separated by an offset from a position of the common search space or a position of the UE-specific search space of the first carrier.

4. The wireless apparatus of claim 1, wherein the resource allocation includes an index of a carrier through which the data channel is transmitted.

5. The wireless apparatus of claim 1, wherein a first resource allocation of the first control channel and a second resource allocation of the second control channel relate to different carriers.

6. A method of monitoring a control channel in a multiple carrier system, comprising:
    monitoring, by a wireless apparatus, a first control channel and a second control channel transmitted over at least one of a plurality of carriers;
    detecting, by the wireless apparatus, the first control channel in at least one of a common search space of a first carrier and a User Equipment (UE)-specific search space of the first carrier;
    detecting, by the wireless apparatus, the second control channel in a UE-specific search space of a second carrier and
    transmitting or receiving, by the wireless apparatus, a data packet on a data channel using a resource allocation received on at least one of the first control channel or the second control channel.

7. The method of claim 6, wherein the monitoring of the first and the second control channels is performed by checking a Cyclic Redundancy Check (CRC) error by de-masking a user equipment's identifier.

* * * * *